(12) United States Patent
Yoshida (10) Patent No.: US 6,829,204 B2
(45) Date of Patent: Dec. 7, 2004

(54) METHOD OF CONTROLLING A ROTATIONAL RATE OF AN OPTICAL DISC AND OPTICAL DISC RECORDING DEVICE USING THE SAME

(75) Inventor: Tohru Yoshida, Nakaniida-Machi (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 09/759,376

(22) Filed: Jan. 16, 2001

(65) Prior Publication Data

US 2001/0050887 A1 Dec. 13, 2001

(30) Foreign Application Priority Data

Jun. 12, 2000 (JP) ...................................... 2000-175949

(51) Int. Cl.[7] .............................................. G11B 5/09
(52) U.S. Cl. ................................. 369/47.47; 369/47.4
(58) Field of Search ........................... 369/47.28, 47.29, 369/47.31, 47.37, 47.4, 47.43, 47.47, 53.3, 53.39, 53.29; 360/72.2, 73.03, 73.01, 71

(56) References Cited

U.S. PATENT DOCUMENTS

| | | | |
|---|---|---|---|
| 4,750,055 A | 6/1988 | Van Lier | 358/342 |
| 5,343,453 A | 8/1994 | Ogino | 369/44.28 |
| 5,808,995 A | 9/1998 | Nakamura et al. | 369/60 |
| 6,678,227 B1 * | 1/2004 | Kondo et al. | 369/47.33 |

FOREIGN PATENT DOCUMENTS

| | | | |
|---|---|---|---|
| JP | 411110901 A * | 4/1999 | G11B/19/24 |
| WO | WO 9634387 A2 * | 10/1996 | G11B/19/28 |

OTHER PUBLICATIONS

Patent Abstracts of Japan, vol. 009, No. 024 (p. 331), Jan. 31, 1985 & JP 59 167874 A, Sep. 21, 1984 *abstract*.

* cited by examiner

*Primary Examiner*—Thang V. Tran
(74) *Attorney, Agent, or Firm*—Staas & Halsey LLP (57) ABSTRACT

An optical disc recording device controls a rotational rate of an optical disc and an optical disc recording device recording using a constant angular velocity method, thereby efficiently using the performance of the optical disc. A CPU reads management information (a maximum address value) for a farthest recording region, which is located at a circumference farthest from a center of the optical disc. A distance from the center of the optical disc to the farthest circumference of the recording region is calculated based on the read maximum address value. The rotational rate is calculated based on the calculated distance so that the recorded data rate of the farthest recording region is a maximum recorded data rate for the optical disc, and therefore is set to be used by a servo controller.

25 Claims, 4 Drawing Sheets

METHOD OF CONTROLLING A ROTATIONAL RATE OF AN OPTICAL DISC AND OPTICAL DISC RECORDING DEVICE USING THE SAME

CROSS-REFERENCE TO RELATED APPLICATIONS

This application claims the benefit of Japanese Application No. 2000-175949, filed Jun. 12, 2000 in the Japanese Patent Office, the disclosure of which is incorporated herein by reference.

BACKGROUND OF THE INVENTION

1. Field of the Invention

The present invention generally relates to a method of controlling the rotational rate of an optical disc in an optical disc recording device, and more particularly, to an optical disc recording device that records data by determining a constant rotational rate for the optical disc.

2. Description of the Related Art

At present, recordable optical discs (i.e., compact disc recordable media (CD-R), or compact disc rewritable media (CD-RW)) are widely used as recording media for preserving data in personal computers, or the like. An optical disc reading and recording device records data to an optical disc using one of two well-known methods. One is a constant linear velocity (CLV) recording method, in which data are recorded by securing a constant linear velocity of an optical disc. The other is a constant angular velocity (CAV) recording method, in which data are recorded by securing a constant rotational rate (i.e., number of rotations, spin rate) of an optical disc.

Generally, the optical disc has a memory region that includes a plurality of recording tracks having a concentric circular or spiral shape. The CD-R or CD-RW needs to record data by securing a constant recording density in recording regions for each circumferential area of the optical disc. Thus, for the CAV recording method that uses a constant rotational rate, the recording capacity for the recording regions on the outer circumference is greater than for the recording regions on the inner circumference. In other words, data recorded on the optical disc per unit time volume (i.e., a recorded data rate) using the CAV recording method is greater at the outer circumference of the optical disc than at the inner circumference of the optical disc. By using the CAV recording method, the data is recorded in the recording regions of the entire circumference without varying the rotational rate of the optical disc, which is advantageous in more easily controlling the motor when randomly recording the data in the recording regions.

Figure 4:
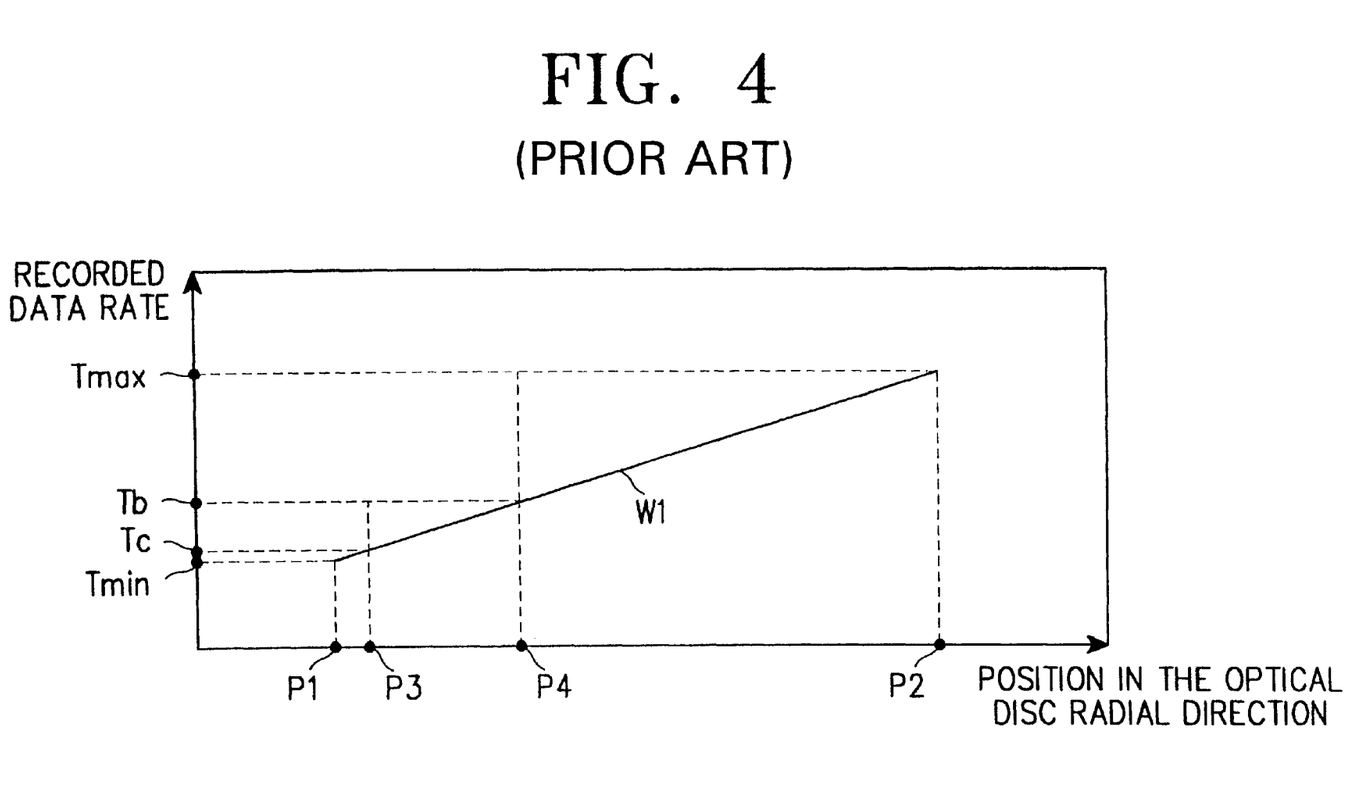
FIG. 4 illustrates a known waveform used for controlling the rotational rate of an optical disc in a optical disc recording device.

FIG. 4 shows a waveform for a known process for controlling the rotational rate of an optical disc.

The horizontal axis represents positions in the recording regions for respective circumferences of the optical disc along the radial direction. The longitudinal axis shows recorded data rates. As shown, P1 is the location of the innermost circumference of the optical disc, and P2 is the position of the outermost circumference of the optical disc. The recorded data rate of the innermost circumference is Tmin, which is the minimum recorded data rate for the optical disc, while the recorded data of the outermost circumference is Tmax, which is the maximum recorded data for the optical disc. W1 is the waveform representing the recorded data rates corresponding to the recording regions of the respective circumferences between P1 and P2.

According to the known method of controlling the rotational rate of the optical disc, the rotational rate is determined so that the recorded data rate of the outermost circumference of the optical disc (P2) is the maximum value Tmax, as shown in the waveform W1 of the FIG. 4.

For example, based on the Hi-Speed standard, the recorded data rates with respect to the all of the circumferences are in the range of 600 kb/s to 1500 kb/s. Based on these values, the recorded data rate of the optical disc outermost circumference is the maximum, 1500 kb/s, which is used to determine the rotational rate during the data recording. As such, the rotational rate is predetermined based on the outermost radius of the optical disc. Therefore, conventionally, the rotational rate for the optical disc recording device is determined in accordance with the size of the optical disc within it.

The known method of controlling the rotational rate of the optical disc using the size and shape of the optical disc has the following problems.

For an optical disc, such as the CD-RW disc based on the Hi-Speed standard, since the rotational rate is determined to be the maximum recorded data rate at the outermost circumference, the recorded data rate is less for all of the other circumferences of the optical disc, regardless of where they are located on the optical disc. Therefore, if the optical disc is formatted to record data in some specific recording regions, and in particular in recording regions near the inner circumference, the recorded data rate is dramatically lower than the maximum recorded data rate. This result occurs despite the fact that the whole optical disc is capable of receiving data recorded at the maximum recorded data rate.

For example, as shown in FIG. 4, if the rotational rate of the optical disc is determined so that the recorded data rate of the outermost circumference of the optical disc is the maximum recorded data rate, the recorded data rate for the recording region P3 becomes Tc, and the recorded data rate for the recording region P4 is Tb. Both recorded data rates Tc and Tb are dramatically less than the maximum recorded data rate Tmax for the optical disc. As a result, the performance of the optical disc cannot be efficiently used.

SUMMARY OF THE INVENTION

It is, therefore, an object of the present invention to provide a method of controlling the rotational rate of an optical disc, and an optical disc recording device using this method to more efficiently use the performance of the optical disc.

Additional objects and advantages of the invention will be set forth in part in the description which follows and, in part, will be obvious from the description, or may be learned by practice of the invention.

To achieve the above and other objects, according to an embodiment of the present invention, there is provided a method of determining a constant rotational rate of an optical disc in an optical disc recording device that includes varying the rotational rate according to a positions of the farthest recording regions from a center of the optical disc.

According to another embodiment of the present invention, the method further comprises reading a farthest position information representing the positions of the farthest recording region, and calculating a distance from the center of the optical disc to the farthest recording region based on the read position information.

According to a still further embodiment of the present invention, the method further comprises calculating the rotational rate so that the recorded data rate of the farthest recording region can be the maximum value for the optical disc based on the distance of the farthest recording region from the center of the optical disc.

According to another embodiment of the present invention, the recording region is a region of the optical disc formatted to record the data.

According to yet another embodiment of the present invention, the farthest position information is an address value corresponding to the farthest circumference formatted to be recorded upon on the optical disc.

According to yet a further embodiment of the present invention, there is provided an optical disc recording device for recording the data on the recording regions of the optical disc by securing a constant rotational rate for the optical disc that comprises a reading unit to read a farthest position information for a farthest recording region that is farthest from a center of the optical disc, a first calculating unit to calculate both a distance from the center of the optical disc to the farthest recording region, and a second calculating unit to calculate a rotational rate so that the recorded data rate of the farthest recording region is the maximum recorded data rate for the optical disc based on the calculated distance.

According to an aspect of the invention, a computer readable medium is encoded with processing instructions for implementing a method of determining a rotational rate of a disc having recording regions performed by a computer, where the method includes sensing data on the disc; and determining the rotational rate for the disc based upon a maximum recorded data rate for the disc and the sensed data.

BRIEF DESCRIPTION OF THE DRAWINGS

The above and other objects, features and advantages of the present invention will become more apparent from the following detailed description when taken in conjunction with the accompanying drawings, in which.

DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
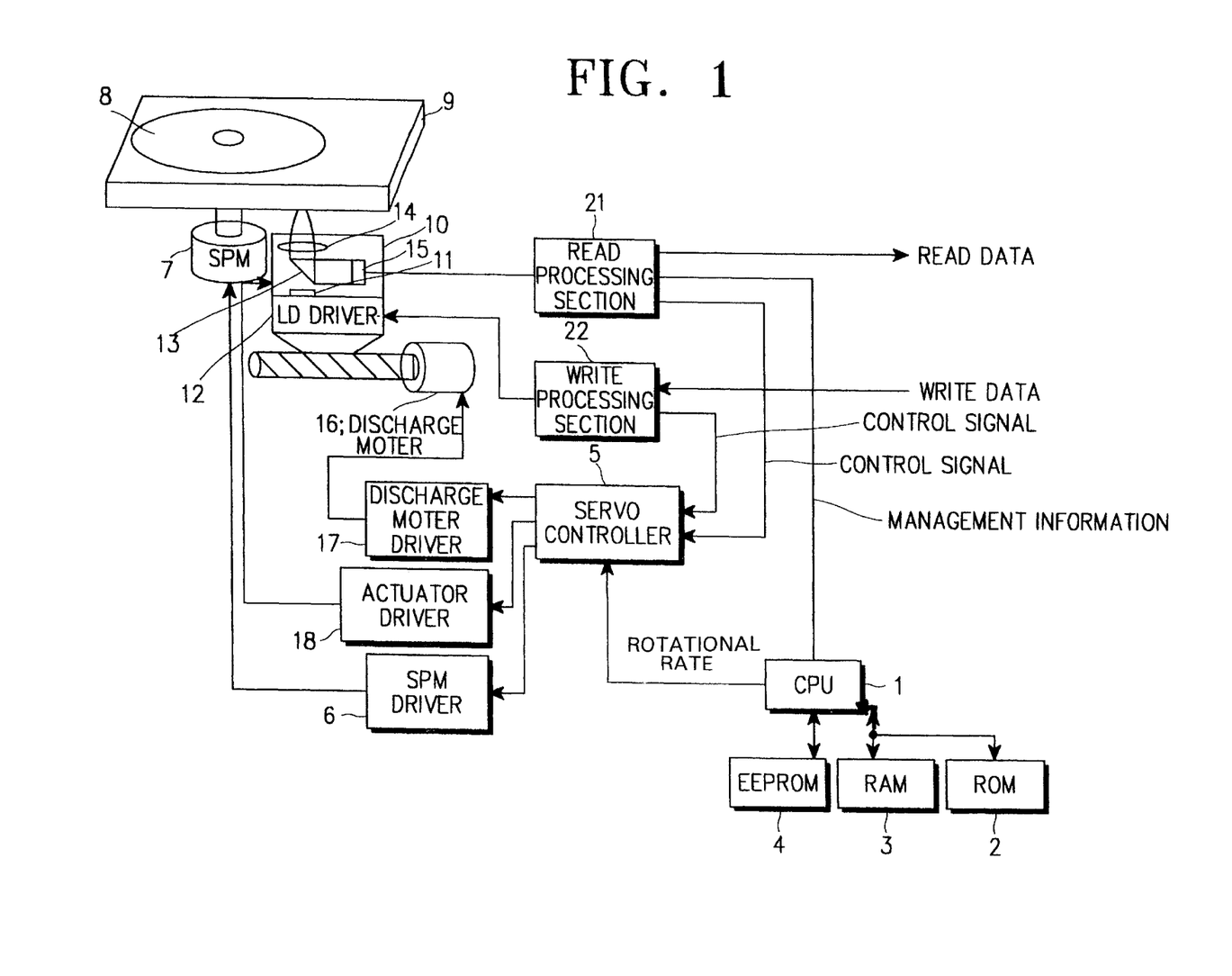
FIG. 1 is a block diagram illustrating an optical disc recording device according to an embodiment of the present invention.

FIG. 1 is a block diagram illustrating an optical disc recording device according to an embodiment of the present invention.

The optical disc recording device uses a constant angular velocity (CAV) recording method to record data by securing a constant rotational rate for an optical disc 8. A central processing unit (CPU) 1 controls the operation of the optical disc recording device. A read-only memory (ROM) 2 stores programs performed by the CPU 1, a random access memory (RAM) 3 temporarily stores data, and a recordable fixed memory 4, such as EEPROM, maintains management data even when the power is off. For the sake of simplicity, only the relevant signals sent or received by the CPU 1 are shown in FIG. 1.

A servo controller 5 controls a discharge motor 16, an actuator (not shown), and a spindle motor (SPM) 7 based on an inputted rotational rate and/or control signals for the disc received from the CPU 1. An SPM driver 6 drives the SPM 7 according to the control signal from the servo controller 5, and rotates the optical disc 8. A tray 9 supports the optical disc 8.

The optical disc 8 is a recordable optical disc (i.e., a compact disc recordable medium (CD-R), a compact disc rewritable medium (CD-RW), etc.). The recording regions of the optical disc 8 include recording tracks of a spiral or concentric circular shape.

A pickup 10 reads and records data from or to the optical disc 8. The pickup 10 includes a semiconductor laser (LD) 11 acting as a light element, an LD driver 12 to drive the LD 11 according to a light control signal from a write processing section 22, and to control the LD 11 to emit a light. As mirror 13 transmits lights from the LD 11 and reflects the light from the LD 11 to the optical disc 8. An objective lens 14 focuses the light. A light receiver 15 receives the light reflected by the mirror 13 and converts the light into an electric signal. An actuator (not shown) controls a position of the objective lens 14 so that the light from the LD 11 can be focused on the optical disc 8. In order to record data to the optical disc 8, the light emitted from the LD 11 is used. However, in order to read data from the optical disc 8, the light reflected from the optical disc 8 is used. The light receiver 15 detects the reflected light.

A discharge motor driver 17 controls a discharge motor 16 so as to move the pickup 10 according to the control signal from the servo controller 5. An actuator driver 18 drives the actuator (not shown) according the control signal from the servo controller 5.

A read processing section 21 restores the data recorded on the optical disc 8 and outputs the restored data as read data based on the signal from the light receiver 15 in the pickup 10. Further, the read processing section 21 generates an actuator control signal and outputs the same to the servo controller 5 based on the signal from the light receiver 15.

Management information is among the data read from the optical disc 8. The management information is outputted to the CPU 1. Generally, the management information is information on the regions of the optical disc 8 such as the address values corresponding to the respective recording regions in the circumferences in the optical disc 8, and the sizes of regions formatted to be recordable. The address values are position information representing addresses of the respective recording regions.

A write processing section 22 generates a light control signal based on inputted write data, and outputs the light control signal to the LD driver 12 in the pickup 10. The write processing section 22 also generates a control signal for recording data on the optical disc 8, and outputs the control signal to the servo controller 5. Further, the write processing section 22 outputs a light control signal for reading data to the LD driver 12, but not when data is being recorded on the optical disc 8.

In the optical disc recording device in FIG. 1, the rotational rate of the disc is calculated by the CPU 1 and is used by the servo controller 5 when recording the data on the optical disc 8. The servo controller 5 rotates the optical disc 8 at a determined rotational rate when recording the data in the recording regions in the circumferences of the optical disc 8. Further, the write processing section 22 generates the light control signal so as to record the data by securing a constant recording density within the recording regions for the circumferences of the optical disc 8. The write data is recorded on the optical disc 8 using lights outputted from the LD 11 driven by the LD 12 according to the light control signal.

Figure 2:
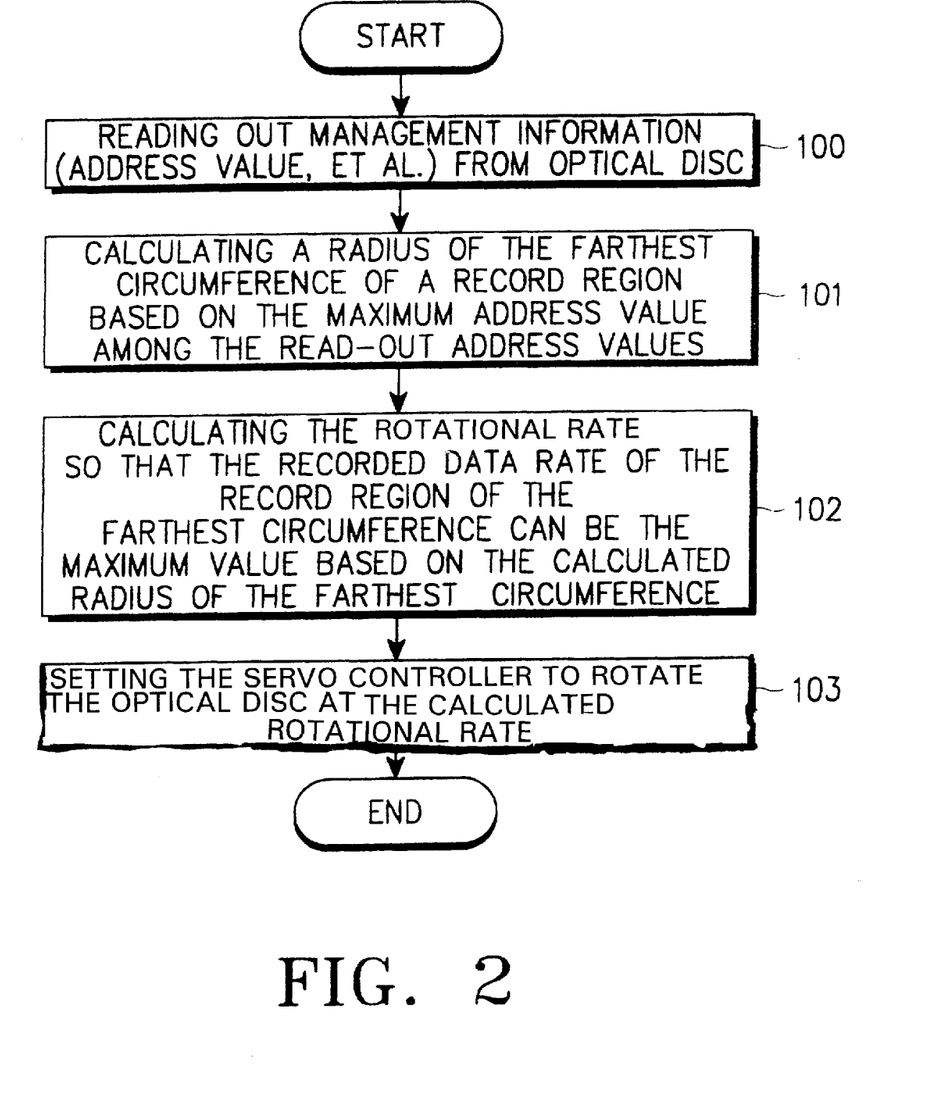
FIG. 2 is a flow chart illustrating a process performed by a CPU in FIG. 1 according to an embodiment of the present invention.
Figure 3:
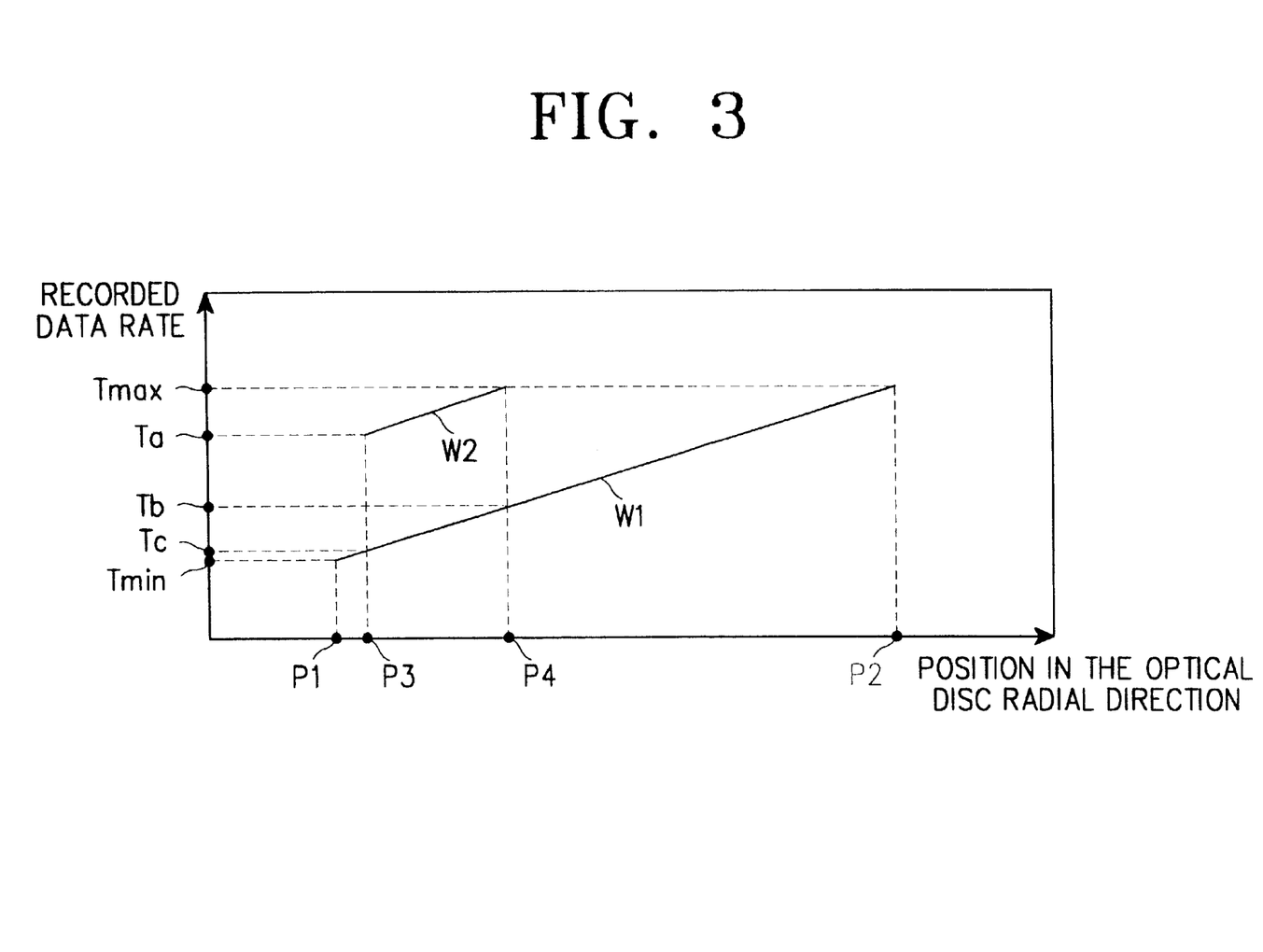
FIG. 3 illustrates an example of a waveform used for controlling the rotational rate of an optical disc in the optical disc recording device in FIG. 1 according to an embodiment of the present invention.

FIGS. 1–3 show a process for calculating the rotational rate used by the optical disc recording device to record data on an optical disc 8. FIG. 2 is a flow chart illustrating the process performed by the CPU 1, and FIG. 3 illustrates a waveform used for explaining the process for controlling the rotational rate of the optical disc 8 in the optical disc recording device in FIG. 1. The process of FIG. 2 performed by the CPU 1 can be performed using processing instructions encoded on a computer readable medium and which is read by the CPU 1.

Referring to FIG. 3, the horizontal axis represents positions of recording regions for respective circumferences of an optical disc 8 along the radius of the optical disc 8. P1 represents a position of an innermost circumference of the optical disc 8, and P2 represents a position of an outermost circumference of the optical disc 8. The longitudinal axis shows recorded data rates. The recorded data rate of the innermost circumference P1 is Tmin, which is the minimum recorded data rate, whereas the recorded data of the outermost circumference P2 is Tmax, which is the maximum recorded data rate for the optical disc 8. W1 and W2 represent waveforms illustrating the recorded data rates corresponding to the recording regions of the respective circumferences.

Generally, the recorded data rates are the volume of data recorded on the optical disc 8 per unit time.

Initially, the optical disc 8 is formatted for the data to be recorded. The positions between P3 and P4 in FIG. 3 are a data recordable format region (i.e., recording region). The address values, which include the positions of the respective recording regions for the circumferences and/or the sizes of the recording regions, are recorded on the optical disc 8 as management information. The address values corresponding to memory regions of the outer circumference are larger than those corresponding to memory regions of the inner circumference. The optical disc 8 has a minimum recorded data rate Tmin and the maximum Tmax for all the circumferences of the optical disc 8.

After the optical disc 8 is mounted on he tray 9 to be used by the optical disc recording device, the CPU 1 reads the management information from the optical disc 8 in step 100. In step 101, the CPU 1 calculates a radius of the farthest-recording region for the circumference farthest from a center of the optical disc 8 based on the maximum address value. The maximum address value corresponds to the farthest recording region for the outermost circumference among the address values of the read management information. As shown in FIG. 3, this calculated radius is P4.

In step 102, the CPU 1 calculates the rotational rate of the optical disc 8 based on the calculated circumference of the farthest recording region so that the recorded data rate of the farthest recording region is the maximum Tmax for the optical disc 8. In step 103, the CPU 1 sets the calculated rotational rate to be used by the servo controller 5 in step 103.

The waveform W2 in FIG. 3 is a waveform representing the recorded data rate corresponding to the recording regions of the each circumference with respect to the optical disc 8 based on the calculated rotational rate of the disc. In the waveform W2, the recorded data rate for the recording region for P3 is Ta, and the recorded data rate for the farthest recording region P4 is the maximum recorded data rate Tmax. These recorded data rates are greater than those values for P3 and P4 found in waveform W1, and therefore, the performance of the optical disc can be used more effectively.

As such, whenever an optical disc 8 is in the optical disc recording device, the constant rotational rate is varied between optical discs according to the position of the farthest recording region corresponding to the farthest circumference from the center of the optical disc. This allows a more efficient use of the performance of the optical disc.

Further, if the optical disc 8 is formatted along the circumferences from P1 to P2, the maximum address value read from the optical disc 8 is P2. The rotational rate calculated based on the maximum address value is then identical with the rotational rate obtained by the conventional method. Therefore, the waveform for the recorded data rate corresponding to the recording region of the each circumference of the optical disc 8 becomes the waveform W1 as also seen in FIG. 4. Since W1 represents the least efficient use of the performance of the optical disc according to an embodiment of the present invention, the present invention is at least as efficient in using the performance of the optical disc as the conventional method. This is particularly true where the position of the farthest recording region of the farthest circumference from the center of the optical disc is located in the inner circumference of the optical disc, thereby obtaining a more advantageous effect.

While the above embodiment has the CPU 1 calculating the rotational rate, it is understood that the rotational rate of the disc can be calculated using dedicated hardware.

Furthermore, the method of securing the constant rotational rate for the optical disc according to the preferred embodiment is applicable to other optical disc recording devices beyond the CD-R disc or CD-RW disc. Particularly, the method is applicable to an optical disc recording device, which has a ROM region as its outer circumference and a rewritable recording region as its inner circumference in the hybrid format.

As stated above, according to the present invention, the optical disc recording device records the data on the recording regions of the optical disc by securing the constant rotational rate for the optical disc, and varies the rotational rate according to the position of the farthest recording region from the center of the optical disc, thereby more efficiently using the performance of the optical disc.

The rotational rate is obtained so that the recorded data rate of the farthest recording region can be the maximum recorded data rate based on the calculated distance of the farthest recording region from a center of the optical disc, thereby maximizing the performance of the optical disc. It is understood that the recorded data rate can also varied according to recording regions other than the farthest recording region.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling a rotational rate of an optical disc in an optical disc recording device, the method comprising:
   recording data on recording regions of the optical disc by securing a rotational rate for the optical disc; and
   changing the rotational rate for the optical disc based upon a detected position of a farthest one of the recording regions from a center of the optical disc.

2. The method of claim 1, further comprising
   reading from the optical disc position information representing the position of the farthest recording region; and
   calculating a distance from the center of the optical disc to the farthest recording region based on the read position information,
   wherein the changing the rotational rate comprises changing the rotational rate according to the calculated distance.

3. The method of claim 2, wherein
   the optical disc has a maximum recorded data rate,
   the method further comprises determining the rotational rate so that, for the determined rotational rate, the recorded data rate of the farthest recording region is the maximum recorded data rate for the optical disc, and
   the changing the rotational rate comprises changing the rotational rate according to the determined rotational rate.

4. The method of claim 1, wherein the recording regions are regions formatted to record the data on the optical disc.

5. The method of claim 4, wherein the position of the farthest recording region is detected from an address value corresponding to the farthest recording region on the optical disc.

6. An optical disc recording device for recording data at recorded data rates in recording regions of an optical disc by securing a rotational rate of the optical disc, the optical disc having a maximum recorded data rate, the device comprising:
   means for reading position information of a farthest one of the recording regions from a center of the optical disc;
   means for calculating a distance from the center of the optical disc to the farthest recording region based on the read position information; and
   means for calculating the rotational rate using the calculated distance so that a recorded data rate of the farthest recording region is the maximum recorded data rate for the optical disc.

7. An optical disc recording device for recording data at recorded data rates in recording regions of an optical disc using a rotational rate of the optical disc, the optical disc having a maximum recorded data rate, the device comprising:
   a reading unit that reads position information of a farthest one of the recording regions from a center of the optical disc;
   a first calculating unit that calculates a distance from the center of the optical disc to the farthest recording region based on the read position information; and
   a second calculating unit that, using the calculated distance, calculates the rotational rate so that, for the calculated rotational rate, a recorded data rate of the farthest recording region is the maximum recorded data rate for the optical disc.

8. The optical disc recording device of claim 7, further comprising a motor that rotates the optical disc in accordance with the rotational rate.

9. The optical disc recording device of claim 8, wherein said first and second calculating units comprise a controller that controls said motor.

10. The optical disc recording device of claim 8, wherein said
    first calculating unit comprises a controller that controls the rotational rate of said motor, and
    said second calculating unit is dedicated hardware that does not control said motor.

11. A method of controlling a rotational rate of a disc in a disc recording device that records data in recording regions of the disc at recorded data rates, the method comprising:
    sensing data on a disc in the disc recording device; and
    determining a rotational rate for the disc based upon a maximum recorded data rate for the disc and the sensed data.

12. The method of claim 11, wherein
    said sensing data comprises determining a position of one of the recording regions from data recorded on the disc; and
    said determining the rotational rate comprises setting the rotational rate such that the one recording region has the maximum recorded data rate for the disc.

13. The method of claim 12, wherein:
    said determining the position comprises:
        reading position information representing the position of the one recording region for the disc; and
        calculating a distance from a center of the disc to the one recording region based on the read position information, and
    the determining the rotational rate further comprises setting the rotational rate such that the maximum recorded data rate occurs at the calculated distance.

14. The method of claim 13, wherein the position information of the one recording region is an address value corresponding to a farthest one of the recording regions from the center of the disc.

15. The method of claim 12, further comprising recording data to the recording regions at recorded data rates that are less than or equal to the maximum recorded data rate while maintaining the rotational rate as constant.

16. The method of claim 15, wherein:
    said determining the position comprises:
        reading position information representing the position of the one recording region for the disc; and
        calculating a distance from a center of the optical disc to the one recording region based on the read position information, and
    the determining the rotational rate further comprises setting the rotational rate such that the maximum recorded data rate occurs at the calculated distance.

17. The method of claim 16, wherein the position information of the one recording region is an address value corresponding to a farthest one of the recording regions from the center of the disc.

18. A method of controlling a rotational rate of an optical disc having a maximum recorded data rate in an optical disc recording device, the method comprising:
    determining a rotational rate for an optical disc such that, for the determined rotational rate, the maximum recorded data rate for the optical disc occurs at a recording region having a radius less than a radius of an outer circumference of the optical disc; and recording the data in recording regions at a constant angular velocity in accordance with the determined rotational rate.

19. A computer readable medium encoded with processing instructions for implementing a method of determining a rotational rate of a disc having recording regions performed by a computer, the method comprising:

sensing data on the disc; and determining the rotational rate for the disc based upon a maximum recorded data rate for the disc and the sensed data.

20. The computer readable medium of claim 19, wherein said sensing data comprises determining a position of one of the recording regions from data recorded on the disc; and said determining the rotational rate comprises setting the rotational rate such that the one recording region has the maximum recorded data rate for the disc.

21. The computer readable medium of claim 20, wherein said determining the position comprises:

receiving position information representing the position of the one recording region;

calculating a distance from a center of the disc to the one recording region based on the received position information; and determining the rotational rate according to the calculated distance.

22. The computer readable medium of claim 21, wherein the position information of the one recording region is an address value corresponding to a farthest one of the recording regions from the center of the disc, and the disc comprises an optical disc.

23. The computer readable medium of claim 20, further comprising controlling the recording of data in the recording regions at recorded data rates less than or equal to the maximum recorded data rate while controlling a motor to maintain the rotational rate.

24. The computer readable medium of claim 23, wherein said determining the position comprises:

receiving position information representing the position of the one recording region;

calculating a distance from a center of the disc to the one recording region based on the read position information; and determining the rotational rate according to the calculated distance.

25. The computer readable medium of claim 24, wherein the position information of the one recording region is an address value corresponding to a farthest one of the recording regions from the center of the disc.

* * * * *

UNITED STATES PATENT AND TRADEMARK OFFICE
CERTIFICATE OF CORRECTION

PATENT NO. : 6,829,204 B2
DATED : December 7, 2004
INVENTOR(S) : Tohru Yoshida

It is certified that error appears in the above-identified patent and that said Letters Patent is hereby corrected as shown below:

<u>Column 7,</u>
Line 20, please add -- : -- after "wherein".

Signed and Sealed this

Second Day of August, 2005

JON W. DUDAS
*Director of the United States Patent and Trademark Office*